UNITED STATES PATENT OFFICE.

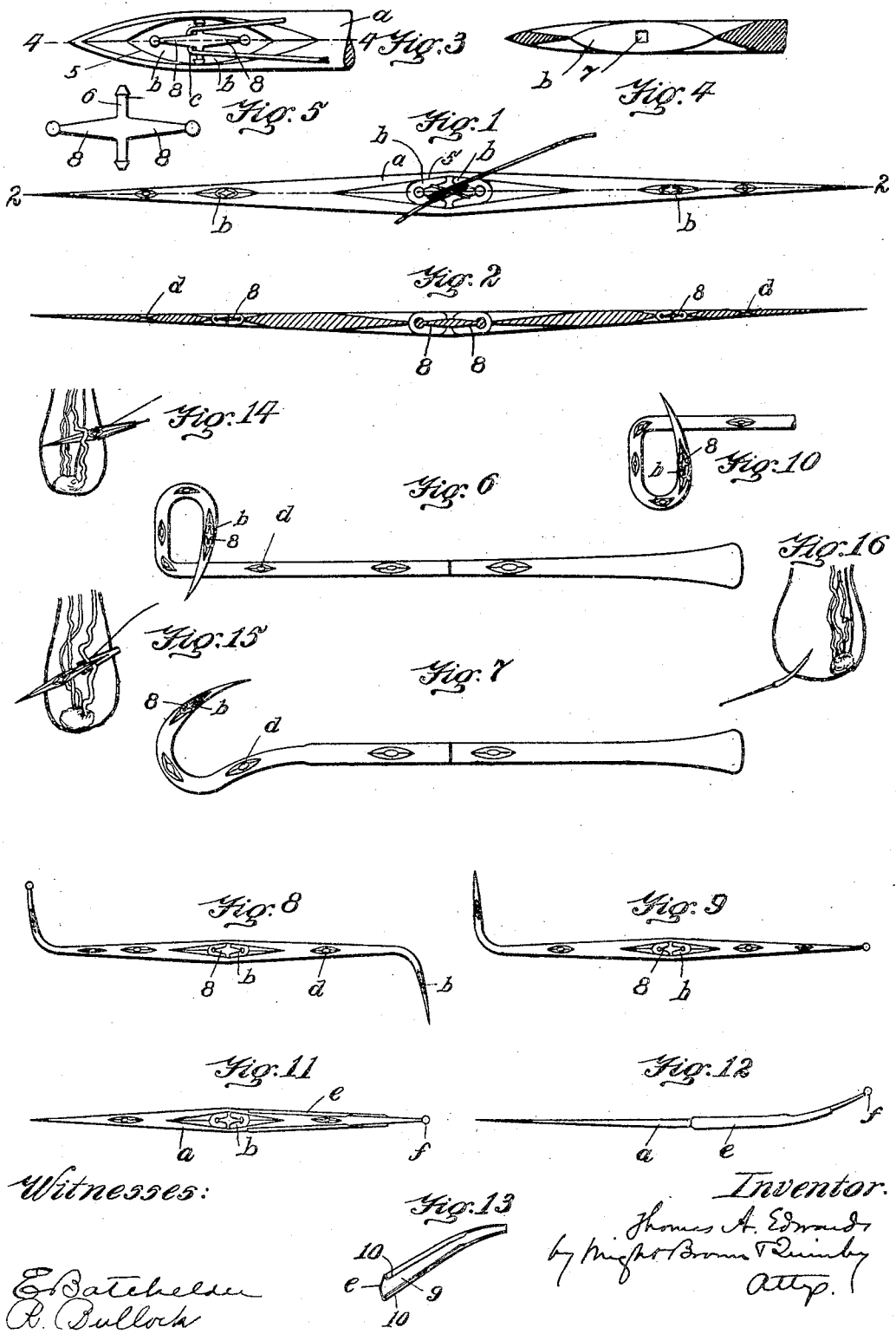

THOMAS A. EDWARDS, OF BOSTON, MASSACHUSETTS.

NEEDLE, &c.

No. 818,152.

Specification of Letters Patent.

Patented April 17, 1906.

Application filed June 1, 1903. Renewed September 11, 1905. Serial No. 278,040.

*To all whom it may concern:*

Be it known that I, THOMAS A. EDWARDS, of Boston, in the county of Suffolk and State of Massachusetts, have invented certain new and useful Improvements in Needles, &c., of which the following is a specification.

This invention relates to elongated penetrating instruments, such as needles for surgical and other purposes, although it is not limited to a sharp-pointed instrument, as the invention may be embodied, as hereinafter described, in a probe for surgical purposes.

The invention has for its object, first, to provide an instrument of this character with an eye adapted to engage a bight or loop in such manner that the thread can be very quickly and conveniently engaged with the needle, and, secondly, to provide an instrument, such as a surgical needle or a probe, with a casing or director adapted to fit closely upon a portion of the instrument and to be left by it in an orifice in which it has been inserted with the instrument, the director serving as a guide for the reinsertion of the instrument.

The invention consists in the improvements which I will now proceed to describe and claim.

Of the accompanying drawings, forming a part of this specification, Figure 1 represents a side view of a surgical needle embodying my invention. Fig. 2 represents a longitudinal section of the same on line 2 2 of Fig. 1. Fig. 3 represents an enlarged view of the pointed end portion of a needle of a different character, said needle having an eye constructed in accordance with my invention. Fig. 4 represents a section on line 4 4 of Fig. 3, the fingered cross-bar in the eye being omitted. Fig. 5 represents a side view of the fingered cross-bar shown in Fig. 3. Figs. 6, 7, 8, 9, and 10 represent views of different forms of surgical instruments each provided with an eye in accordance with my invention. Fig. 11 represents a side view, and Fig. 12 an edge view, of a combined needle and probe provided with a grooved director in accordance with my invention. Fig. 13 represents a perspective view of the director shown in Figs. 11 and 12. Figs. 14 and 15 represent views illustrating the use of my improved needle in the treatment of varicocele. Fig. 16 represents a view illustrating the use of the needle in the treatment of hydrocele.

The same reference characters indicate the same parts in all the figures.

In carrying out my invention so far as the same relates to the eye of a surgical or other needle I provide the shank or body portion $a$ with an eye $b$, which is substantially loop-shaped—that is to say, one side of the eye has a reëntrant curve or angle, while the opposite side has a salient curve or angle, the latter pointing toward the penetrating end of the instrument. This construction enables the needle to be threaded by passing a bight or loop $c$ of thread under the portion or member of the needle which forms the salient side of the eye, as indicated in Fig. 3. By providing a sufficient length of thread between the loop $c$ and the free end the thread can in this way be securely, as well as quickly and conveniently, engaged with the needle without liability of slipping or reeving through the eye.

I prefer to duplicate the eye $b$, two eyes of similar shape being provided, arranged base to base, as shown in the drawings, and particularly in Figs. 1 and 3, the salient side of one eye projecting toward one point and the salient side of the other eye projecting toward the opposite point.

The preferred construction, whereby the eyes $b$ $b$ are provided, is as follows: An elongated orifice 5 is formed in the body of the needle, said orifice extending lengthwise of the needle, its length considerably exceeding its width. With the sides of the orifice I engage the ends of a cross-bar 6, said sides being preferably provided with sockets 7, Fig. 4, to receive the ends of the cross-bar 6, the arrangement being such that when the cross-bar is inserted in the sockets it forms a transverse division, subdividing the orifice 5 into two parts. The cross-bar 6 is provided with two oppositely-projecting fingers 8 8, which extend into the subdivisions of the orifice in the needle and form the salient or inner sides of the loop-shaped eyes $b$ $b$. The ends of the fingers 8 are preferably provided with rounded enlargements, as shown in the drawings, to assist in retaining the loop of thread.

Figs. 6, 7, 8, 9, and 10 represent various forms of curved needles, each having an eye or a pair of eyes constructed as above described and each capable of use in a manner which will be readily understood by surgeons. In each case I have shown the body of the needle provided with one or more orifices or eyes $d$, which may be of ordinary form and are intended to receive the loose or free end of the thread engaged with one of the eyes $b$.

When a number of these eyes d are provided, the free end can be threaded through one or more of said eyes.

In Figs. 11, 12, and 13 I show an attachment e for a surgical needle or probe, which attachment I term a "grooved director." This attachment is formed to closely fit a portion of the instrument a, and its external form is such that it approximates closely the form and dimensions of the part of the instrument to which it is applied, so that it is adapted to be inserted with the instrument in an orifice either made by the instrument carrying the director or previously formed, its connection with the instrument being detachable, so that it may be left in the orifice after the instrument has been withdrawn, the director subsequently acting to guide or direct the instrument again into the orifice. The director e is preferably made of thin sheet metal and comprises a back portion 9 and edge flanges 10 10, the back portion bearing against one side of the instrument a, while the flanges engage the edges of the instrument, as indicated in Fig. 11. This director may be used in connection with a probe having the usual boss f at its end.

In the treatment of hydrocele, abscesses, and other conditions requiring an emptying of the fluid, pus, &c., contained in such sacs, cystic tumors, or any other such affection where it is best to empty the sac of its contents this instrument will be found superior to the "trocar and canula" heretofore used, for the reason that the grooved director is carried in and left in position the same as the canula is introduced with the trocar and especially for the reason that the grooved director of this instrument will more perfectly empty the sac through its groove than it is possible to do with the tubular canula, the director acting as a spout. After the sac is thus perfectly emptied of its contents the sac or cavity can be more thoroughly irrigated and treated by means of antiseptics, astringents, styptics, caustics, or by means of any other medication desired the same as through the tubular canula, with the added advantage that the irrigating liquid, fluid, or solution and the medicinal remedies used can be more easily and perfectly drained out again through the grooved director, if so desired, than through a tubular canula. Besides, if it is found best to make a more extensive opening or free incision it is easily done by means of a probe-pointed bistoury passed along the groove of the director which is already in place, or if it is found best not to empty the sac of all of its original contents or any part of that which may have been introduced into it and which latter may have been introduced by means of irrigator, syringe, probe, or any other artificial means a removal of the director at the desired time will cause the needle-puncture to collapse, closing the opening, and retain the amount desired in the sac, and the openings may be hermetically sealed by the application of flexible collodion over the external openings made by this instrument in any operation, if so desired.

Varicosed veins and aneurisms in any part of the body are successfully ligated with this instrument by means or in a manner similar to those outlined herein for varicocele.

The director may be detached and left in position for drainage and irrigation or other treatment of cavities, sacs, &c., or to aid as a guide for the return of either the pointed or probe end of said instrument.

In the treatment of varicocele the instrument is first threaded with the desired ligature which may be any or either of those used in surgery, depending in a measure upon just how the ligatures are finally to be disposed of.

I prefer to use a catgut ligature and to do the work as follows: I first thrust the instrument through the skin and behind the spermatic vein, pushing the instrument half-way or more through both sides of the scrotum or until the director is midway underneath or behind the spermatic vein, as shown in Fig. 14. At this point the director is detached and the instrument pushed farther through, as shown in Fig. 15, until the probe end of the instrument can be raised over and in front of said vein. The probe-point is then dropped into the director and the instrument returned back through the same opening it made in the commencement of the operation by following the director with said probe-point. Thus the vein is looped with a double ligature and tied, allowing the ligatures and vein to remain in the scrotum.

My invention so far as it relates to the loop-shaped eye may be embodied in a needle for domestic work, such as knitting or crocheting, or for any other purpose.

In a needle for domestic work I prefer to engage the ends of the cross-bar or bridge 6 with the sockets in the sides of the orifice b in such manner that the cross-bar can be turned or rotated, thus causing the fingers 8 to project from the sides of the needle for convenience in engaging the thread therewith. The ends of the cross-bar 6 and the walls of the sockets 7 may be of polygonal form in cross-section to prevent the loose or unobstructed turning of the cross-bar, the frictional engagement between the said parts being such as to hold the cross-bar with its fingers in line with the body of the needle when the same is in use and to permit the turning of the cross-bar when sufficient force is exerted.

It is obvious that the cross-bar 6 may be rigid and formed as an integral part of the instrument or otherwise rigidly attached thereto. For surgical work I prefer to make said cross-bar rigid.

Having thus explained the nature of my invention and described a way of constructing and using the same, although without having attempted to set forth all the forms in which it may be embodied or all the modes of its use, I declare that what I claim is—

1. A needle having a loop-shaped eye, one side of which is reëntrant, while the other side is salient, the latter pointing toward the penetrating end of the instrument.

2. A needle having two substantially loop-shaped eyes, arranged base to base, one side of each eye being reëntrant, while the other side is salient.

3. A needle having a longitudinally-extending aperture, and a bridge extending across said aperture and provided with oppositely-extending fingers, said bridge and fingers forming the inner walls of loop-shaped eyes, the outer walls of which are parts of the wall of the orifice.

4. A surgical instrument such as a needle, having a casing or director formed to closely fit a portion of the instrument and detachable therefrom, so that the said director may be left in an orifice or puncture to guide the instrument back through the same opening.

5. A pointed penetrating surgical instrument having means for carrying a ligature, and provided with a detachable grooved director.

6. A needle having a longitudinally-extending aperture and a cross-bar or bridge extending across said aperture and provided with a finger extending lengthwise of the needle, the ends of the bridge being rotatably engaged with the sides of the aperture, so that the finger may be projected from the needle.

7. A needle having a longitudinally-extending aperture, and a bridge extending across said aperture and provided with oppositely-extending fingers, said bridge and fingers forming the inner walls of loop-shaped eyes, the outer walls of which are parts of the wall of the orifice, the ends of said bridge being rotatably engaged with the sides of the aperture, so that the fingers may be projected from the needle.

In testimony whereof I have affixed my signature in presence of two witnesses.

THOMAS A. EDWARDS.

Witnesses:
C. F. BROWN,
E. BATCHELDER.